Figure 6:
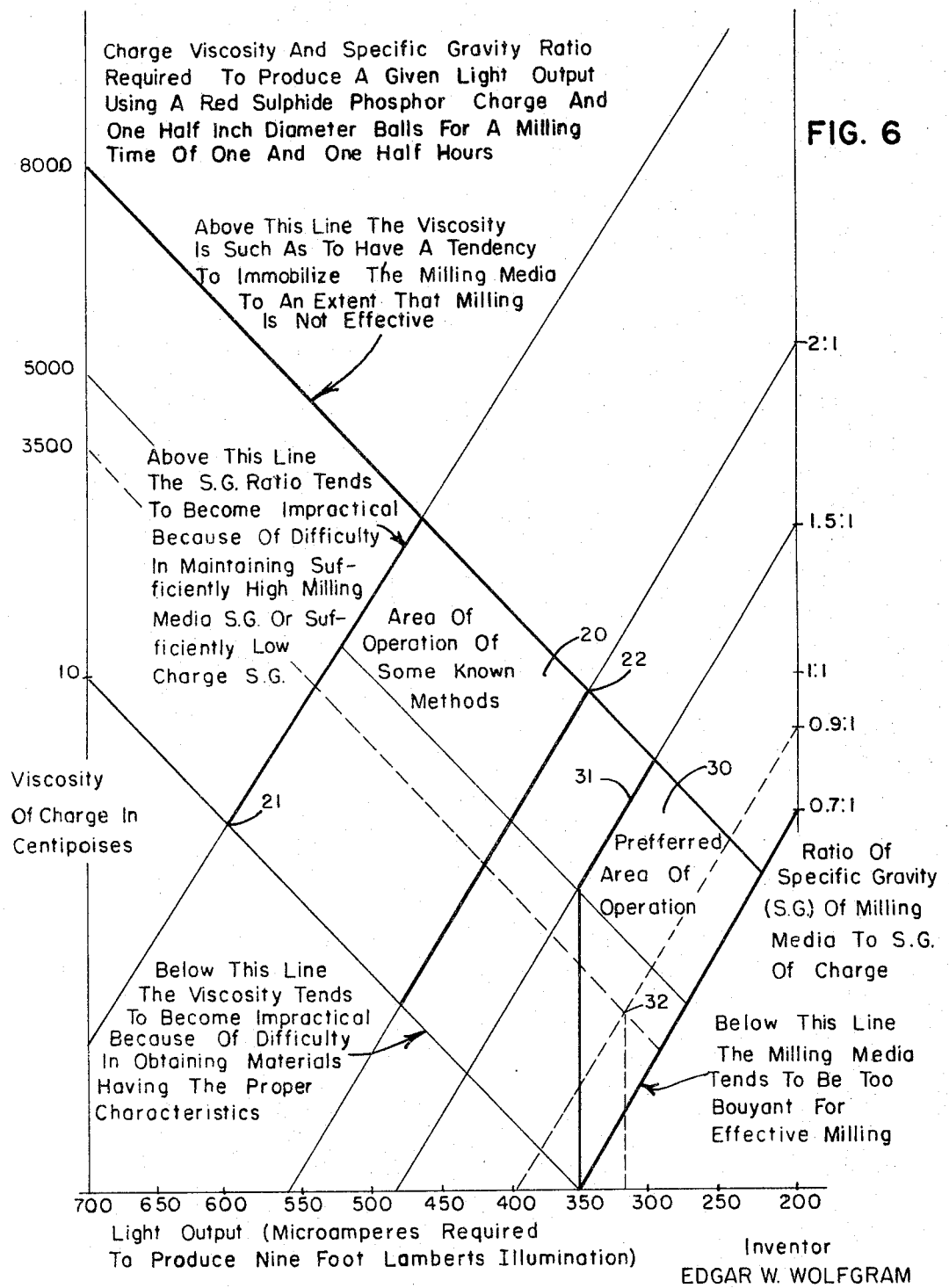

Nov. 21, 1967     E. W. WOLFGRAM     3,353,753

CATHODE RAY TUBE MANUFACTURE

Filed July 22, 1965     2 Sheets-Sheet 1

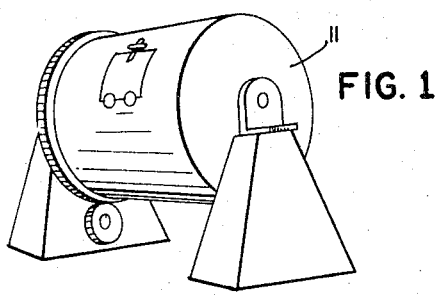
FIG. 1

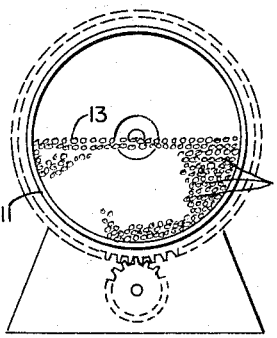
FIG. 2

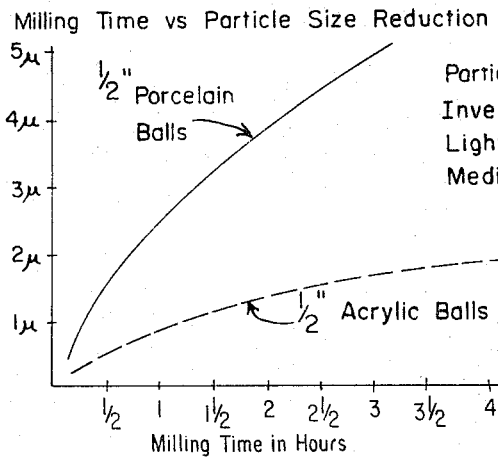
FIG. 5 — Milling Time vs Particle Size Reduction

Particle Size Reduction In Microns (Phosphor With Average Diam. Of From 7μ To 12μ At Start.)

Particle Size Reduction Is Inversely Proportional To Light Output (Based On Median Particle Size.)

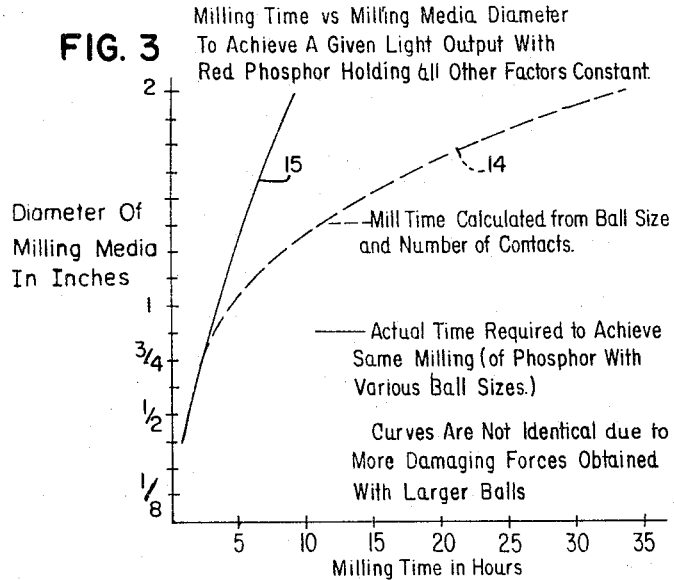
FIG. 3 — Milling Time vs Milling Media Diameter To Achieve A Given Light Output With Red Phosphor Holding All Other Factors Constant.

--- Mill Time Calculated from Ball Size and Number of Contacts.

——— Actual Time Required to Achieve Same Milling (of Phosphor With Various Ball Sizes.)

Curves Are Not Identical due to More Damaging Forces Obtained With Larger Balls

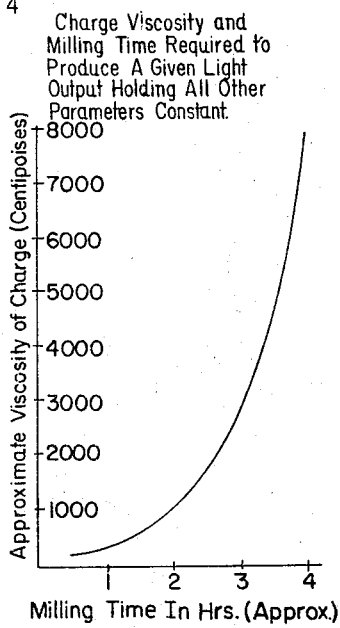
FIG. 4 — Charge Viscosity and Milling Time Required to Produce A Given Light Output Holding All Other Parameters Constant.

Inventor
EDGAR W. WOLFGRAM
BY
Mueller, Aichele & Raumer
ATTYS.

United States Patent Office 3,353,753
Patented Nov. 21, 1967

3,353,753
CATHODE RAY TUBE MANUFACTURE
Edgar W. Wolfgram, Glen Ellyn, Ill., assignor to Motorola, Inc., Franklin Park, Ill., a corporation of Illinois
Filed July 22, 1965, Ser. No. 474,081
14 Claims. (Cl. 241—15)

This invention relates to cathode ray tubes, and more particularly to the preparation of phosphor slurry for application to the screen of a tube such as a color television picture tube.

Color television picture tubes include a screen upon which are deposited three types of photosensitive phosphor coatings (for example, red, green and blue). Each of the phosphor coatings is then established in a dot pattern. A shadow mask structure is supported behind the screen and three electron beams are swept across the viewing screen. Each of the three electron beams passes through the apertures of the shadow mask structure to strike a respective set of phosphor dots to cause the phosphor to emit colored light. This produces an image having a color depending upon the relative energization of the different phosphors by the electron beams.

There are several known methods for coating the screen of the picture tube with the phosphors to achieve a uniform dispersal of the phosphor crystals over the screen area. One such method involves the preparation of a phosphor slurry comprised of a mixture of water or polyvinyl alcohol or both, phosphor crystals of a particular color, and a photosensitive substance. The slurry is applied to the screen of the picture tube by a spinning and baking process.

An important factor in obtaining uniform dispersion of the phosphor crystals over the screen is that the various crystals be evenly dispersed and thoroughly wetted in the slurry preparation. It has been found satisfactory to prepare the phosphor slurry from a charge or suspension of phosphor crystals in water or polyvinyl alcohol, in which the phosphor crystals have been thoroughly dispersed and wetted by ball milling. Such a technique has been found to afford good consistency in the results with satisfactory distribution of crystals and the breaking up of the crystal aggregates. A difficulty with such a technique, however, is in the ball milling process itself. When the phosphor crystal charge is ball milled thoroughly enough to wet and disperse the phosphor crystals including breaking up the crystal aggregates, the surfaces of the crystals may be damaged. As a result of such surface damage, the light output attained from the final phosphor coating is substantially diminished.

It is an object of this invention to improve the light output or brilliance of the phosphor screen coating in color television picture tubes.

Another object of the invention is to provide an improved technique for the preparation of phosphor slurry for application to the screen of color television picture tubes.

Still another object of the invention is to provide a technique for ball milling phosphor crystal charge which minimizes crystal surface damage.

A feature of the invention is the provision, in a process of ball milling a phosphor crystal charge, of milling media of a specific gravity having a ratio to the specific gravity of the charge of between 0.7 to 1 and 1.5 to 1.

Another feature of the invention is the provision, in a process of ball milling a phosphor crystal charge, of milling media comprised of balls of acrylic plastic between ⅜ inch and 1½ inches in diameter and wherein the charge viscosity is less than 8,000 centipoises.

Still another feature of the invention is the provision, in a process of ball milling a phosphor crystal charge, of balls and charge each having a specific gravity of between 0.9 and 1.6, and wherein the ratio of the specific gravity of the balls to the specific gravity of the charge is between 0.7 to 1 and 1.5 to 1.

In the drawings:
FIG. 1 is a perspective view of a ball mill of a type which may be utilized in connection with the invention;
FIG. 2 is a cross-sectional view of the ball mill of FIG. 1 showing the interior thereof;
FIG. 3 is a graph illustrating the effect of milling time on particle size reduction under a given set of conditions;
FIG. 4 is a graph illustrating the relationship between the diameter of the milling media and the milling time to produce a given light output under a given set of conditions;
FIG. 5 is a graph illustrating the relationship between charge viscosity and milling time for a given light output and a given set of conditions; and
FIG. 6 is a chart illustrating the relationship between charge viscosity, charge specific gravity, milling media specific gravity and light output.

The invention relates to the preparation of phosphor slurry for application to the screen of a color television picture tube. A rotatable mill having a chamber therein is partially filled with milling media. The chamber is also partially filled with a phosphor crystal charge having a viscosity of less than 8,000 centipoises. The ratio of the specific gravity of the milling media to the specific gravity of the charge is between 0.7 to 1 and 1.5 to 1. When the mill is rotated to wet and disperse the phosphor crystals in the charge and to break up crystal aggregates, damage to the surface of the crystals is minimized so that screen surfaces manufactured from a phosphor slurry prepared from such a charge provide improved brilliance.

FIG. 1 illustrates a ball mill of a type which may be used in connection with the invention. Basically, a ball mill consists of a vessel which is rotatable about a horizontal axis. The vessel is filled with milling media usually consisting of a plurality of balls or cylinders of steel, porcelain or ceramic material. The mill is rotated at a speed which causes the balls to be carried up the side of the vessel a certain distance and then to tumble back down to the bottom of the vessel. The vessel is filled with a material to be milled and the action of the balls and the material causes the desired reduction in particle size or mixing of the material being milled.

Ball milling has been found to be a satisfactory technique for the preparation of phosphor slurry for application to the screens of color television picture tubes. A charge is prepared comprised of phosphor crystals in a liquid suspension of water or polyvinyl alcohol or both. Such a charge is ball milled to break up aggregates of the phosphor crystals and thoroughly wet and disperse the crystals throughout the charge. The phosphor slurry is then prepared from the charge. It has been found, however, that such milling causes a reduction in the size of the phosphor crystals and damage to the crystal surface. The result of such damage is a substantial reduction in the brilliance of the screen prepared from such crystals.

In accordance with the invention, the various parameters involved in the milling process are selected to be related in a substantially different manner than known milling techniques. As a result, damage to the phosphor crystal surfaces is minimized with a consequent improvement in screen brilliance. The mill 11 is filled approximately half way with milling media, preferably balls 12 having a diameter of between ⅜ inch and 1½ inches. These balls have a specific gravity of between 0.9 and 1.6. Such a specific gravity might be achieved by utilizing a relatively dense ball material with the balls having a hollow interior. It has been found, however, that solid balls comprised of an acrylic plastic of the specific gravity of the order of 1.2 are satisfactory. Other materials might be used, but the surface hardness of the milling media should be kept as soft as possible to minimize damage or grinding of the phosphor crystals. The milling media material is limited in softness due to the quantity of material which would be removed by the phosphor crystals resulting in slurry contamination and excessive grinding of the milling media. The surface should be as smooth as possible to prevent the phosphor crystals from clinging to the balls and to facilitate easy cleaning.

The size of the milling media should be as small as possible with the minimum size limit being larger than the size in which the ball or cylinder would act as a suspension. Thus, the ball must have sufficient mass to move within the mill charge with minimum restriction. The viscosity of the mill charge will also affect this movement and is discussed in detail below. The smaller the ball the more contacts between balls per given volume, resulting in a lessening of the required milling time. The size, however, should not be smaller than that which would allow a minimum milling time in order to adequately wet and disperse the phosphor crystals. The maximum size limit is not as critical as the minimum size limit, but larger milling media means fewer contacts which lengthens the milling time required and causes greater crystal damage. Larger milling media also necessitates greater charge viscosity as explained subsequently.

FIG. 3 illustrates the relationship between milling time and ball diameter to achieve a given light output holding all other factors constant. The diagram shown is for a charge containing red sulphide phosphor crystals. The theoretical milling time may be calculated from ball size, which affects the number of contacts which the balls make with the particles. The smaller the balls with which the mill is filled, the greater the total particle contacts the balls have during each mill revolution because their collective surface area is greater. Since the light output is proportional to the total contacts, the theoretical time required to attain the necessary number of contacts may be found by dividing the mill rate of revolution by the number of revolutions required to produce the total number of contacts necessary for the given light output. It will be seen that the theoretical milling time (curve 14) differs considerably in the later stages of grinding time from the actual time (curve 15) required to achieve the same light output determined from empirical data. This is because when larger balls are used, there is a greater amount of crystal damage due to increased mass to surface area ratio. Thus the larger balls are striking the surface of the crystals with more force.

After filling the mill with the milling media, it is then filled with a charge 13 comprised of water or polyvinyl alcohol or both in which phosphor crystals are suspended. The mill should be filled such that the charge just covers or equals the level of the balls. Substantially less charge would result in more damage to the crystals due to a lack of buoyancy or cushioning effect on the milling media. Substantially more charge would result in less efficient milling and would require a longer milling time resulting in more crystal damage.

The viscosity of the charge should be less than 8,000 centipoises because, beyond that viscosity, the charge tends to be difficult to remove from the mill and has a tendency to immobilize the balls to such an extent that milling is not effective. Within this limitation, the viscosity should be as high as is necessary to properly cushion the grinding media, thereby directing most of the ball energy to moving the charge and not in crushing the crystals. In this way, force is transmitted through the charge to the crystals and not through direct ball-crystal contact. The maximum viscosity is limited as a practical matter, however, by the milling time required. In FIG. 4 it will be seen that the required milling time to achieve a given light output for a given size of balls increases exponentially with the viscosity of the charge. This is because when the charge has a greater viscosity, the balls are not as mobile in the charge and consequently do not mix as rapidly.

Viscosity may be varied by altering the viscosity of the suspending liquid and this is preferable to varying charge viscosity by altering the amount of crystals in suspension. The latter tends to make determination of parameters more difficult because of its greater affect on charge specific gravity and on the milling time required to thoroughly wet the crystals. For a given grinding media diameter, the lower the specific gravity of the grinding media, the less the charge viscosity required. For a given grinding media specific gravity, the larger the grinding media diameter, the greater the viscosity required to cushion the grinding media because of the greater mass to surface area ratio. Thus the upper limit of ball size is governed by the upper limit of viscosity. Conversely, the smaller the grinding media, the less cushioning required and consequently a lower charge viscosity may be used.

The relationship between the specific gravity of the milling media and the specific gravity of the charge affects the buoyancy of the milling media and hence their ability to move through the charge. It has been found satisfactory that the specific gravity of the charge be between 0.9 and 1.6, and the specific gravity of the milling media be in the same range. The ratio of the specific gravity of the milling media to the specific gravity of the charge should be between 0.7 to 1 and 1.5 to 1. At a ratio of below 0.7 to 1 the balls tend to be too buoyant for effective milling. At a ratio greater than 1.5 to 1 the balls tend to have too great a freedom to move and hence excessive crystal damage results unless charge viscosity is increased to what may exceed practical limits.

The mill 11 is then rotated at a speed which is between 40% and 60% of the critical velocity. The critical velocity is that speed at which the balls would tend to cling to the inner surface of the mill. At between 40% and 60% of this velocity, a cascading of the balls occurs of a nature which causes thorough mixing and wetting of the phosphor crystals in the charge. The charge is milled in this manner for a period of between one-half hour and three hours depending upon the other parameters used in the process. It is desirable to set the other parameters so that milling time is minimized to minimize crystal damage and reduce production time. Aggregate separation is very rapid at the beginning of the milling process and then tapers off to a constant minimum level. The milling time should be long enough to avoid being within the beginning portion of rapid particle size reduction because of the rigid and sensitive controls which would have to be applied. There is, therefore, a minimum milling time requirement to wet down and thoroughly disperse the crystals which may be from ¼ to ½ hour.

FIG. 5 is a graph illustrating the relationship between milling time and particle size reduction for a given light output, all other factors being constant. A particle may be an individual phosphor crystal or an aggregate or cluster of such crystals. Particle size reduction in microns is on the vertical scale and is based upon a phosphor having particles with a diameter of from 7 to 12 microns at the start of milling. The solid line shows the result when half inch porcelain balls are used. Porcelain balls would have a specific gravity ratio to a typical phosphor crystal charge of approximately 2.5 to 1. It will be seen that a considerable reduction in particle size results over the space of the first two hours of milling time. This is because, in addition to the breaking up of the aggregates or clusters of phosphor crystals comprising the particles, actual grinding of the phosphor crystals takes place with a consequent reduction in their size. Thus, the median particle size is substantially reduced.

Contrasted with this, the dashed curve in FIG. 5 shows the results when half inch acrylic plastic balls are used. It will be seen that the particle size reduction is substantially less because the size reduction is primarily the result of the breaking up of the aggregates and not a result of actual crystal grinding. Since crystal size reduction or grinding is inversely proportional to light output, it will be seen that light output is substantially increased.

Assuming a given diameter ball and a given milling time, the relationship between the various parameters may be determined from FIG. 6 which shows such relationships in connection with a red sulfide phosphor charge. The intersection of a line drawn from a point on the viscosity scale parallel to those lines already drawn with a line drawn from a point on the specific gravity ratio scale parallel to those lines already drawn determines the light output which is produced by the screen. This light output is measured in microamperes of beam current required to produce 9 foot lamberts of illumination. Known methods operate with specific gravity ratios of 2:1 and higher. This is because the materials often used are porcelain or similar dense material of high specific gravity. As is shown in the chart, the area of known methods of operation (area 20) is with higher specific gravity ratios and result in light outputs of approximately 600 (intersection point 21) to a little less than 400 microamperes (intersection point 22).

The preferred area of operation 30, on the other hand, produces light outputs of better than 350 microamperes. The preferred area 30 is shown to be between 0.7:1 and 1.5:1 in specific gravity ratio at a viscosity of under 8,000 centipoises. The line 31 of the preferred area results from the fact that it is often desirable to increase viscosity with increased specific gravity ratios to provide better cushioning of the crystals. As a general rule, operation too close to the limits of the area of operation increases the likelihood of problems arising because of the fact that the parameters will vary somewhat and could vary enough to cause operation outside the desired area. A satisfactory brilliance has been achieved utilizing a viscosity of 3500 centipoises and a specific gravity ratio of 0.9 to 1. This relationship, as shown by the dotted lines in FIG. 6, intersecting at point 32, is well within the preferred area of operation and resulted in a light output of between 350 and 300 microamperes.

Other factors which can affect the method parameters are the size of the mill and the operating temperature. Temperature, of course, will affect viscosity and hence the two factors are somewhat inter-related. For a larger mill, it is generally desirable to increase the viscosity of the charge to cushion against the increased forces exerted on the charge by the balls due to their greater total weight. If possible, rather than increasing viscosity it might be advisable to decrease the milling time, providing a thorough dispersion and breaking up of aggregates occurs.

It might be said that the most significant relationship in the preparation of phosphor slurry by ball milling technique is the relation of the mobility of the balls in the charge to the milling time. The greater mobility the balls have in the charge, the less milling time required beyond the minimum time necessary for thorough wetting and dispersion. Factors determining the mobility of the balls are the specific gravity ratio of the balls to the charge, the viscosity of the charge, and the diameter of the balls. This relationship might be shown by the formula $$M_b \sim \frac{G_b \cdot D_b{}^K}{G_c \cdot V}$$

where $M_b$ is the mobility, $G_b$ is the specific gravity of the balls, $G_c$ is the specific gravity of the charge, $V$ is the viscosity of the charge and $D_b$ is the diameter of the balls. $K$ is a proportionality constant for the surface to weight ratio of the balls. Since above the critical level of wetting and dispersion the light output is inversely proportional to the mobility, the ball size, and the milling time, a relationship between light output and the other parameters might be such as follows:

$$O \sim \frac{G_c \cdot b}{G_b \cdot t} \cdot D_b{}^{k+c}$$

where $O$ is the light output and $c$ is a constant of proportionality for ball contacts to size. The other symbols are as before.

It may, therefore, be seen that the invention provides an improved technique for substantially increasing the light output in color television picture tubes. The technique relates to the preparation of phosphor slurry for the application to the screen of such tubes and minimizes crystal damage during ball milling of the phosphor crystal charge from which the slurry is prepared.

I claim:

1. A method of preparing phosphor slurry for application to the screen of a color television picture tube, including the following steps: providing a rotatable mill having a chamber therein, partially filling the chamber with milling media having a first specific gravity, partially filling the chamber with phosphor crystal charge of a second specific gravity and of a viscosity less than 8,000 centipoises, said first specific gravity having a ratio to said second specific gravity of between 0.7 to 1 and 1.5 to 1, and rotating the mill to wet and disperse the phosphor crystals in the charge and break up aggregates of such crystals.

2. The method of claim 1 wherein the specific gravity of the milling media is between 0.9 and 1.6.

3. The method of claim 1 wherein the milling media is comprised of balls having a diameter of between 3/8 inch and 1½ inches.

4. The method of claim 1 wherein the milling media material is an acrylic plastic.

5. A method of preparing phosphor slurry for application to the screen of a color television picture tube, including the following steps: providing a rotatable mill having a chamber therein, partially filling the chamber with balls having a first specific gravity, partially filling the chamber with phosphor crystal charge of a second specific gravity and of a viscosity less than 8,000 centipoises, said first specific gravity having a ratio to said second specific gravity of between 0.7 to 1 and 1.5 to 1, and rotating the mill at an angular velocity of between 40% and 60% of the critical velocity for a period of between one half hour and three hours.

6. A method of preparing phosphor slurry for application to the screen of a color television picture tube, including the following steps: providing a rotatable mill having a chamber therein, partially filling the chamber with balls having a specific gravity of between 0.9 and 1.6, partially filling the chamber with phosphor crystal charge of a given specific gravity and of a viscosity of less than 8,000 centipoises, said ball material having a specific gravity having a ratio to said given specific gravity of between 0.7 to 1 and 1.5 to 1, and rotating the mill at an angular velocity of between 40 and 60% of the critical velocity for a period of between one half hour and three hours.

7. A method of preparing phosphor slurry for application to the screen of a color television picture tube, including the following steps: providing a rotatable mill having a chamber therein, filling between 40 and 60% of the chamber with balls having a specific gravity of between 0.9 and 1.6, filling the chamber to approximately the level of the balls with phosphor crystal charge having a specific gravity of between 0.9 and 1.6 and having a viscosity of less than 8,000 centipoises, said specific gravity of ball material having a ratio to said specific gravity of phosphor crystal charge of between 0.7 to 1 and 1.5 to 1, and rotating the mill at an angular velocity of between 40 and 60% of the critical velocity for a period of between one half hour and three hours.

8. A method of preparing phosphor slurry for application to the screen of a color television picture tube, including the following steps: providing a rotatable mill having a chamber therein, filling approximately half the chamber with balls of a diameter of the order of one half inch and of a specific gravity of the order of 1.2, filling the chamber to approximately the level of the balls with a phosphor crystal charge having a specific gravity of the order of 1.3 and a viscosity of the order of three thousand five hundred centipoises, and rotating the mill at an angular velocity of approximately 60% of the critical velocity for a period of approximately one and one half hours.

9. The method of claim 8 wherein the ball material is an arcyclic plastic.

10. Apparatus for preparing phosphor slurry for application to the screen of a color television tube, including in combination, a rotatable mill having a chamber therein, a plurality of milling media elements partially filling said chamber and having a first specific gravity, a phosphor crystal charge partially filling said chamber and having a second specific gravity and a viscosity of less than 8,000 centipoises, said first specific gravity having a ratio to said second specific gravity of between 0.7 to 1 and 1.5 to 1.

11. The apparatus of claim 10 wherein the specific gravity of said milling media material is between 0.9 and 1.6.

12. The apparatus of claim 10 wherein said milling media is comprised of balls having a diameter of between ⅜ inch and 1½ inches.

13. The apparatus of claim 10 wherein the material of said milling media is an acrylic plastic.

14. Apparatus for preparing phosphor slurry for application to the screen of a color television tube, including in combination, a rotatable mill having a chamber therein, a plurality of balls filling approximately half the chamber, each of said balls having a diameter of the order of ½ inch and a specific gravity of the order of 1.2, a phosphor crystal charge filling the chamber to approximately the level of the balls and having a specific gravity of the order of 1.3 and a viscosity of the order of 3,500 centipoises, and means for rotating the mill at an angular velocity of approximately 60% of the critical velocity for a period of approximately one and one half hours.

References Cited
UNITED STATES PATENTS 3,008,656　11/1961　Weston _____ 241—15 X
3,165,269　1/1965　Blackburn et al. _____ 241—30

WILLIAM W. DYER, JR., *Primary Examiner.*

W. D. BRAY, *Assistant Examiner.*